(12) United States Patent
Wahlgren

(10) Patent No.: US 11,696,524 B2
(45) Date of Patent: *Jul. 11, 2023

(54) ROBOTIC VEHICLE WITH ADJUSTABLE OPERATING AREA

(71) Applicant: HUSQVARNA AB, Huskvarna (SE)

(72) Inventor: Håkan Wahlgren, Huskvarna (SE)

(73) Assignee: HUSQVARNA AB, Huskvarna (SE)

(*) Notice: Subject to any disclaimer, the term of this patent is extended or adjusted under 35 U.S.C. 154(b) by 374 days.

This patent is subject to a terminal disclaimer.

(21) Appl. No.: 16/743,094

(22) Filed: Jan. 15, 2020

(65) Prior Publication Data

US 2020/0146211 A1  May 14, 2020

Related U.S. Application Data

(63) Continuation of application No. 15/537,666, filed as application No. PCT/IB2015/057932 on Oct. 15, 2015, now Pat. No. 10,568,258.

(60) Provisional application No. 62/095,793, filed on Dec. 23, 2014.

(51) Int. Cl.
*A01D 34/00* (2006.01)
*G05D 1/02* (2020.01)

(52) U.S. Cl.
CPC ......... *A01D 34/008* (2013.01); *A01D 34/006* (2013.01); *G05D 1/0214* (2013.01); *G05D 1/0278* (2013.01); *G05D 2201/0208* (2013.01)

(58) Field of Classification Search
CPC .. A01D 34/008; A01D 34/006; G05D 1/0214; G05D 1/0278; G05D 2201/0208

USPC .......................................................... 701/23
See application file for complete search history.

(56) References Cited

U.S. PATENT DOCUMENTS

| 6,338,013 | B1 | 1/2002 | Ruffner |
| 2012/0290165 | A1 | 11/2012 | Ouyang |
| 2013/0238130 | A1* | 9/2013 | Dorschel ............. G05D 1/0274 700/259 |

FOREIGN PATENT DOCUMENTS

EP  2412223 A2  2/2012

OTHER PUBLICATIONS

International Search Report and Written Opinion for International Application No. PCT/IB2015/057932 dated Jan. 19, 2016.
International Preliminary Report on Patentability for International Application No. PCT/IB2015/057932 dated Jun. 27, 2017.

* cited by examiner

*Primary Examiner* — Maceeh Anwari
(74) *Attorney, Agent, or Firm* — Burr & Forman LLP

(57) ABSTRACT

A robotic vehicle may include one or more functional components configured to execute lawn care function, a sensor network comprising one or more sensors configured to detect conditions proximate to the robotic vehicle, a positioning module configured to determine robotic vehicle position while the robotic vehicle traverses a parcel, and a boundary management module configured to enable the robotic vehicle to be operated within a bounded area. The bounded area may include a variable boundary, and the boundary management module may be configured to receive instructions from an operator to adjust the variable boundary.

17 Claims, 6 Drawing Sheets

ND OPERATING AREA

ROBOTIC VEHICLE WITH ADJUSTABLE OPERATING AREA

CROSS REFERENCE TO RELATED APPLICATIONS

This application is a continuation application of U.S. patent application Ser. No. 15/537,666 filed Jun. 19, 2017, which was a U.S. national stage entry of international application PCT/IB2015/057932 filed Oct. 15, 2015, which claims priority from U.S. Provisional Patent Application No. 62/095,793 filed Dec. 23, 2014, and claims the benefit of its earlier filing date under 35 U.S.C. 119(e); each of U.S. patent application Ser. No. 15/537,666, international application PCT/IB2015/057932 and U.S. Provisional Patent Application No. 62/095,793 are incorporated herein by reference in their entirety.

TECHNICAL FIELD

Example embodiments generally relate to robotic vehicles and, more particularly, relate to a robotic vehicle that is configurable to operate within multiple selectable areas of different sizes.

BACKGROUND

Yard maintenance tasks are commonly performed using various tools and/or machines that are configured for the performance of corresponding specific tasks. Certain tasks, like grass cutting, are typically performed by lawn mowers. Lawn mowers themselves may have many different configurations to support the needs and budgets of consumers. Walk-behind lawn mowers are typically compact, have comparatively small engines and are relatively inexpensive. Meanwhile, at the other end of the spectrum, riding lawn mowers, such as lawn tractors, can be quite large. More recently, robotic mowers and/or remote controlled mowers have also become options for consumers to consider.

Robotic mowers are typically confined to operating on a parcel of land that is bounded by some form of boundary wire. The robotic mower is capable of detecting the boundary wire and operating relatively autonomously within the area defined by the boundary wire. However, the laying of the boundary wire can be a time consuming and difficult task, which operators would prefer to avoid, if possible. That said, to date it has been difficult to try to provide a robotic mower that can truly operate without any need for a boundary wire. Limitations on the accuracy of positioning equipment have played a large role in making this problem difficult to solve.

Additionally, even if it were possible to accurately determine vehicle position, there is currently no comprehensive way to ensure that the robotic vehicle only services the specific areas of a garden or yard that are actually desired for servicing. Given that computing devices are becoming more ubiquitous, it is to be expected that they may be employed to assist in operation of lawn mowers. As such, many additional functionalities may be provided or supported by the employment of computing devices on lawn mowers.

BRIEF SUMMARY OF SOME EXAMPLES

Some example embodiments may therefore provide a robotic vehicle that is configured to be controllable to operate with respect to adjustable areas. Thus, for example, one or more operators may be enabled to interact with a service to upgrade (or downgrade) the amount of coverage that the operator(s) seek to obtain from the service. In some cases, payment or subscription could be handled online or via an application, and coverage changes could be performed remotely and relatively instantaneously.

In an example embodiment, a robotic vehicle is provided. The robotic vehicle may include one or more functional components configured to execute a lawn care function, a sensor network comprising one or more sensors configured to detect conditions proximate to the robotic vehicle, a positioning module configured to determine robotic vehicle position while the robotic vehicle traverses a parcel, and a boundary management module configured to enable the robotic vehicle to be operated within a bounded area. The bounded area may include a variable boundary, and the boundary management module may be configured to receive instructions from an operator to adjust the variable boundary.

In another example embodiment, a method of adjusting an operating area of a robotic vehicle is provided. The method may include storing at least one boundary set defining a bounded area having a variable boundary, receiving an instruction to modify the variable boundary, adjusting the variable boundary based on the instruction to define a changed bounded area, and facilitating operation of the robotic vehicle with the changed bounded area.

Some example embodiments may improve the ability of operators or fleet managers to maximize the effectiveness and operation of a robotic vehicle.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
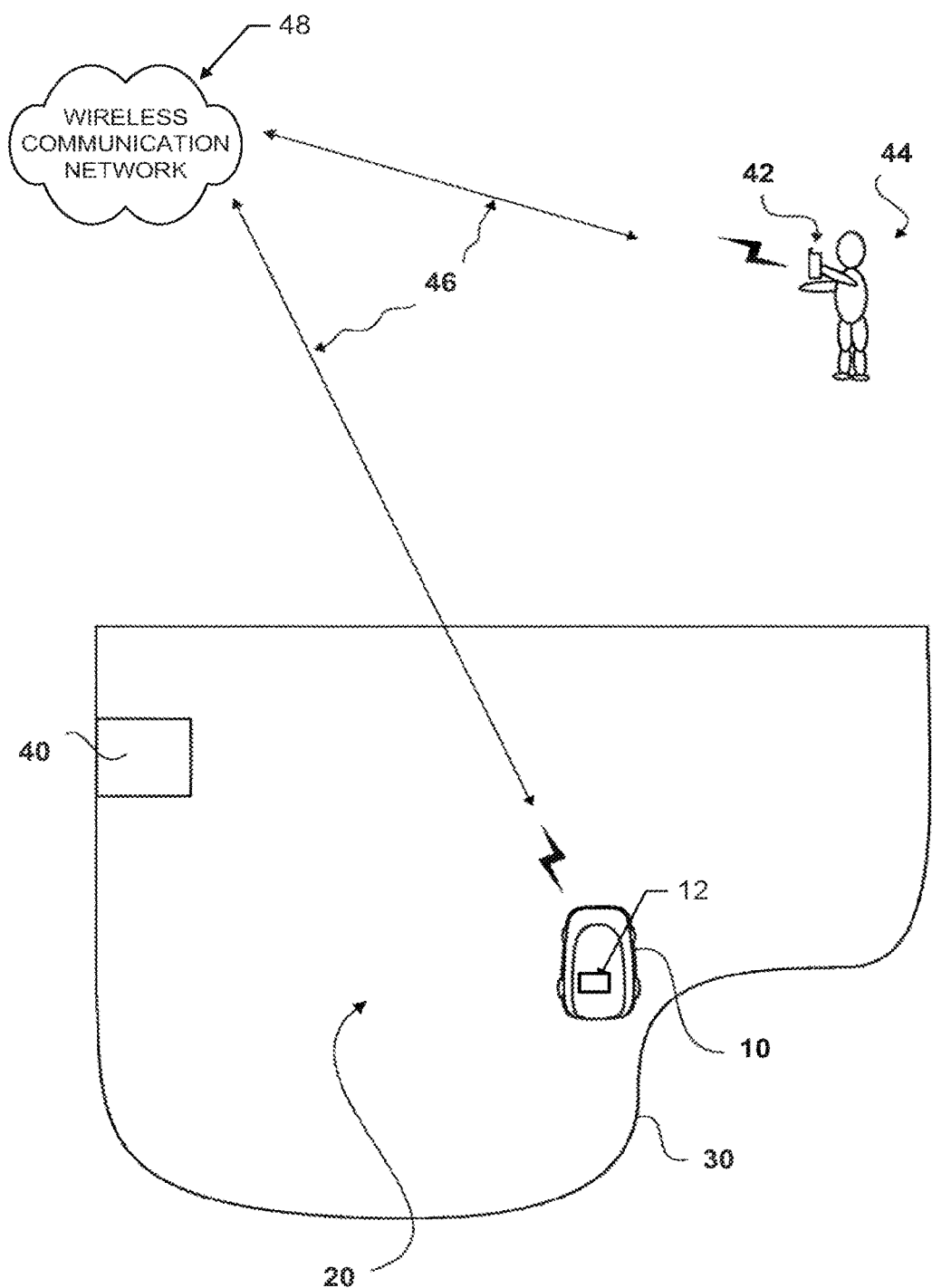
FIG. 1 illustrates an example operating environment for a robotic mower.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. Additionally, the term "yard maintenance" is meant to relate to any outdoor grounds improvement or maintenance related activity and need not specifically apply to activities directly tied to grass, turf or sod care. As used herein, operable coupling should be understood to relate to direct or indirect connection that, in either case, enables functional interconnection of components that are operably coupled to each other.

Robotic mowers, which are one example of a robotic vehicle of an example embodiment, typically mow an area that is defined by a boundary wire that bounds the area to be mowed. The robotic mower then roams within the bounded area to ensure that the entire area is mowed, but the robotic mower does not go outside of the bounded area. By placing a number of sensors on the robotic vehicle, the robotic vehicle may also be enabled to identify its boundaries without the use of boundary wires. However, in either case, the robotic mower typically operates within a single bounded area (however, such area is defined).

Once the robotic mower is configured to be able to distinguish between different zones or areas, and/or modify its understanding of the boundaries of a particular zone or area, the robotic mower becomes capable of servicing areas of variable size. By further providing the robotic mower with a transceiver to allow it to communicate with external devices or networks, management of the robotic mower can be accomplished by interaction with a service that could be cloud-based. Some example embodiments are described herein to discuss structures and configurations for supporting these capabilities.

FIG. 1 illustrates an example operating environment for a robotic mower 10 that may be employed in connection with an example embodiment. However, it should be appreciated that example embodiments may be employed on numerous other robotic vehicles, so the robotic mower 10 should be recognized as merely one example of such a vehicle. The robotic mower 10 may operate to cut grass on a parcel 20 (i.e., a land lot, yard, or garden), the boundary 30 of which may be defined using one or more physical boundaries (e.g., a fence, wall, curb and/or the like), or programmed location based boundaries or combinations thereof. When the boundary 30 is a detected, by any suitable means, the robotic mower 10 may be informed so that it can operate in a manner that prevents the robotic mower 10 from leaving or moving outside the boundary 30. In some cases, the boundary 30 could be provided by a wire that is detectable by the robotic mower 10. However, example embodiments may also or alternatively be capable of detecting boundaries without a wire using accurate position information determinable from one or more positioning sources on the robotic mower 10.

The robotic mower 10 may be controlled, at least in part, via control circuitry 12 located onboard. The control circuitry 12 may include, among other things, a positioning module and a sensor suite, which will be described in greater detail below. Accordingly, the robotic mower 10 may utilize the control circuitry 12 to define a path for coverage of the parcel 20 in terms of performing a task over specified portions or the entire parcel 20. In this regard, the positioning module may be used to guide the robotic mower 10 over the parcel 20 and to ensure that full coverage (of at least predetermined portions of the parcel 20) is obtained, while the sensor suite may detect objects and/or gather data regarding the surroundings of the robotic mower 10 while the parcel 20 is traversed.

If a sensor suite is employed, the sensor suite may include a sensors related to positional determination (e.g., a GPS receiver, an accelerometer, a camera, a radar transmitter/detector, an ultrasonic sensor, a laser scanner and/or the like). Thus, for example, positional determinations may be made using GPS, inertial navigation, optical flow, radio navigation, visual location (e.g., VSLAM) and/or other positioning techniques or combinations thereof. Accordingly, the sensors may be used, at least in part, for determining the location of the robotic mower 10 relative to boundaries or other points of interest (e.g., a starting point or other key features) of the parcel 20, or determining a position history or track of the robotic mower 10 over time. The sensors may also detect objects, collision, tipping over, or various fault conditions. In some cases, the sensors may also or alternatively collect data regarding various measurable parameters (e.g., moisture, temperature, soil conditions, etc.) associated with particular locations on the parcel 20.

In an example embodiment, the robotic mower 10 may be battery powered via one or more rechargeable batteries. Accordingly, the robotic mower 10 may be configured to return to a charge station 40 that may be located at some position on the parcel 20 in order to recharge the batteries. The batteries may power a drive system and a blade control system of the robotic mower 10. However, the control circuitry 12 of the robotic mower 10 may selectively control the application of power or other control signals to the drive system and/or the blade control system to direct the operation of the drive system and/or blade control system. Accordingly, movement of the robotic mower 10 over the parcel 20 may be controlled by the control circuitry 12 in a manner that enables the robotic mower 10 to systematically traverse the parcel while operating a cutting blade to cut the grass on the parcel 20. In cases where the robotic vehicle is not a mower, the control circuitry 12 may be configured to control another functional or working assembly that may replace the blade control system and blades.

In some embodiments, the control circuitry 12 and/or a communication node at the charge station 40 may be configured to communicate wirelessly with an electronic device 42 (e.g., a personal computer, a cloud based computer, server, mobile telephone, PDA, tablet, smart phone, and/or the like) of a remote operator 44 (or user) via wireless links 46 associated with a wireless communication network 48. The wireless communication network 48 may provide operable coupling between the remote operator 44 and the robotic mower 10 via the electronic device 42, which may act as a remote control device for the robotic mower 10 or may receive data indicative or related to the operation of the robotic mower 10. However, it should be appreciated that the wireless communication network 48 may include additional or internal components that facilitate the communication links and protocols employed. Thus, some portions of the wireless communication network 48 may employ additional components and connections that may be wired and/or wireless. For example, the charge station 40 may have a wired connection to a computer or server that is connected to the wireless communication network 48, which may then wirelessly connect to the electronic device 42. As another example, the robotic mower 10 may wirelessly connect to the wireless communication network 48 (directly or indirectly) and a wired connection may be established between one or more servers of the wireless communication network 48 and a PC of the remote operator 44. In some embodiments, the wireless communication network 48 may be a data network, such as a local area network (LAN), a metropolitan area network (MAN), a wide area network (WAN)

(e.g., the Internet), and/or the like, which may couple the robotic mower 10 to devices such as processing elements (e.g., personal computers, server computers or the like) or databases. Accordingly, communication between the wireless communication network 48 and the devices or databases (e.g., servers, electronic device 42, control circuitry 12) may be accomplished by either wireline or wireless communication mechanisms and corresponding protocols.

Figure 2:
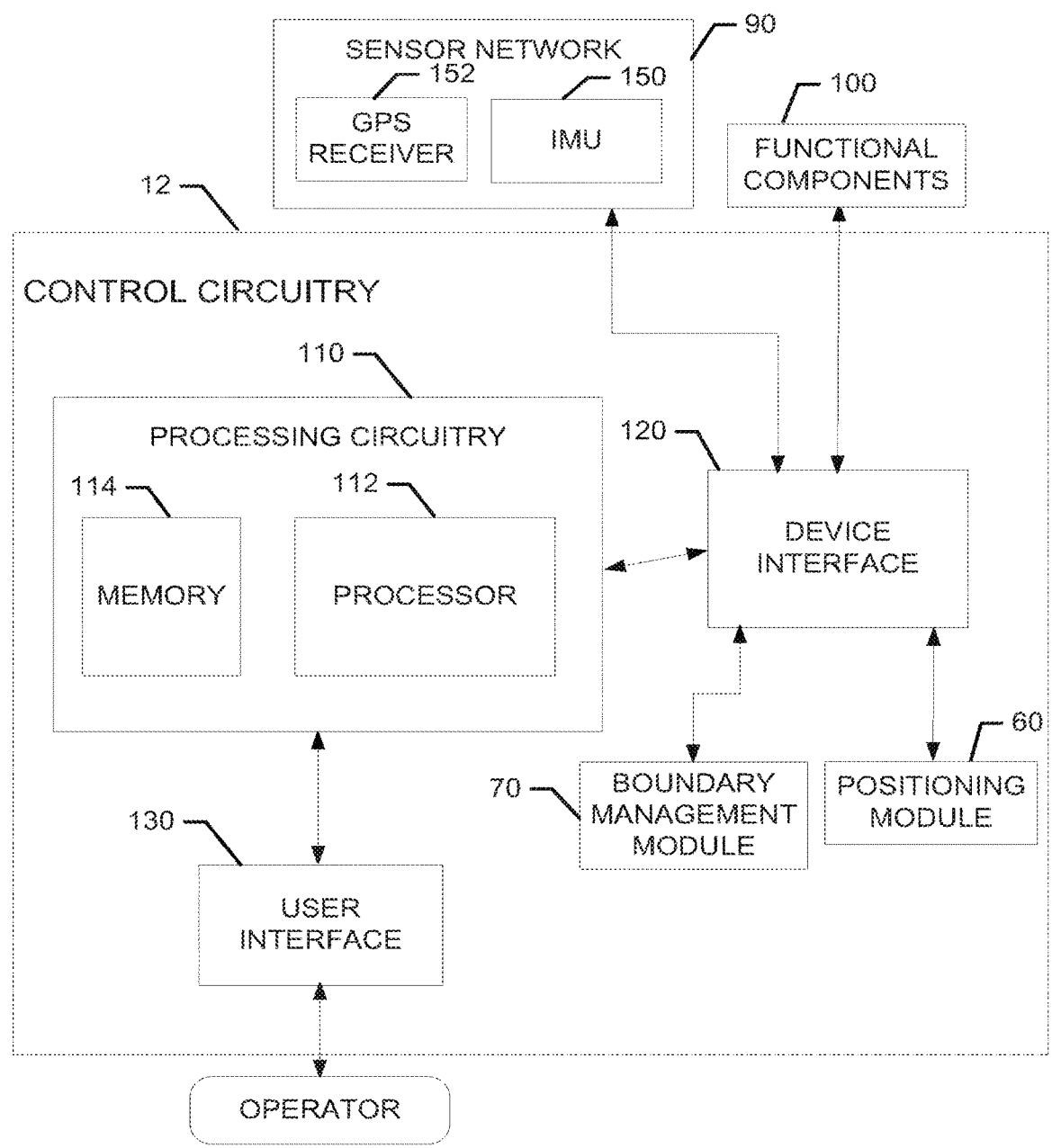
FIG. 2 illustrates a block diagram of various components of control circuitry to illustrate some of the components that enable or enhance the functional performance of the robotic mower and to facilitate description of an example embodiment.

FIG. 2 illustrates a block diagram of various components of the control circuitry 12 to illustrate some of the components that enable or enhance the functional performance of the robotic mower 10 and to facilitate description of an example embodiment. In some example embodiments, the control circuitry 12 may include or otherwise be in communication with a vehicle positioning module 60, and a boundary management module 70. The vehicle positioning module 60 and the boundary management module 70 may work together to give the robotic mower 10 a comprehensive understanding of its environment, and enable it to be operated autonomously within bounded areas of variable size or character including some cases in which no boundary wires are employed.

In some cases, the vehicle positioning module 60 may be part of a sensor network 90 of the robotic mower 10. However, in some cases, the vehicle positioning module 60 may be separate from but otherwise in communication with the sensor network 90 to facilitate operation of the vehicle positioning module 60. The boundary management module 70 may be an entity embodied as configured hardware, where the configuration is as described herein and/or performs functions as described herein.

The robotic mower 10 may also include one or more functional components 100 that may be controlled by the control circuitry 12 or otherwise be operated in connection with the operation of the robotic mower 10. The functional components 100 may include a wheel assembly (or other mobility assembly components), one or more cutting blades and corresponding blade control components, and/or other such devices. In embodiments where the robotic vehicle is not a mower, the functional components 100 may include equipment for performing various lawn care functions such as, for example, taking soil samples, operating valves, distributing water, seed, powder, pellets or chemicals, and/or other functional devices and/or components.

The control circuitry 12 may include processing circuitry 110 that may be configured to perform data processing or control function execution and/or other processing and management services according to an example embodiment of the present invention. In some embodiments, the processing circuitry 110 may be embodied as a chip or chip set. In other words, the processing circuitry 110 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The processing circuitry 110 may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 110 may include one or more instances of a processor 112 and memory 114 that may be in communication with or otherwise control a device interface 120 and, in some cases, a user interface 130. As such, the processing circuitry 110 may be embodied as a circuit chip (e.g., an integrated circuit chip) configured (e.g., with hardware, software or a combination of hardware and software) to perform operations described herein. However, in some embodiments, the processing circuitry 110 may be embodied as a portion of an on-board computer. In some embodiments, the processing circuitry 110 may communicate with electronic components and/or sensors of the robotic mower 10 via a single data bus. As such, the data bus may connect to a plurality or all of the switching components, sensory components and/or other electrically controlled components of the robotic mower 10.

The processor 112 may be embodied in a number of different ways. For example, the processor 112 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 112 may be configured to execute instructions stored in the memory 114 or otherwise accessible to the processor 112. As such, whether configured by hardware or by a combination of hardware and software, the processor 112 may represent an entity (e.g., physically embodied in circuitry—in the form of processing circuitry 110) capable of performing operations according to embodiments of the present invention while configured accordingly. Thus, for example, when the processor 112 is embodied as an ASIC, FPGA or the like, the processor 112 may be specifically configured hardware for conducting the operations described herein. Alternatively, as another example, when the processor 112 is embodied as an executor of software instructions, the instructions may specifically configure the processor 112 to perform the operations described herein.

In an example embodiment, the processor 112 (or the processing circuitry 110) may be embodied as, include or otherwise control the vehicle positioning module 60 and the boundary management module 70. As such, in some embodiments, the processor 112 (or the processing circuitry 110) may be said to cause each of the operations described in connection with the vehicle positioning module 60 and the boundary management module 70 by directing the vehicle positioning module 60 and the boundary management module 70, respectively, to undertake the corresponding functionalities responsive to execution of instructions or algorithms configuring the processor 112 (or processing circuitry 110) accordingly. These instructions or algorithms may configure the processing circuitry 110, and thereby also the robotic mower 10, into a tool for driving the corresponding physical components for performing corresponding functions in the physical world in accordance with the instructions provided.

In an exemplary embodiment, the memory 114 may include one or more non-transitory memory devices such as, for example, volatile and/or non-volatile memory that may be either fixed or removable. The memory 114 may be configured to store information, data, applications, instructions or the like for enabling the vehicle positioning module 60 and the boundary management module 70 to carry out various functions in accordance with exemplary embodiments of the present invention. For example, the memory 114 could be configured to buffer input data for processing by the processor 112. Additionally or alternatively, the memory 114 could be configured to store instructions for execution by the processor 112. As yet another alternative, the memory 114 may include one or more databases that may store a variety of data sets responsive to input from various sensors or components of the robotic mower 10. Among the contents of the memory 114, applications may be stored for execution by the processor 112 in order to carry out the functionality associated with each respective application.

The applications may include applications for controlling the robotic mower 10 relative to various operations including determining an accurate position of the robotic mower 10 (e.g., using one or more sensors with the vehicle positioning module 60). Alternatively or additionally, the applications may include applications for controlling the robotic mower 10 in relation to boundaries or borders relative to which the robotic mower 10 must navigate. Alternatively or additionally, the applications may include applications for enabling the robotic mower 10 to communicate with external devices and/or networks, and to change its operations relative to boundaries on the basis of such communications.

The user interface 130 (if implemented) may be in communication with the processing circuitry 110 to receive an indication of a user input at the user interface 130 and/or to provide an audible, visual, mechanical or other output to the user. As such, the user interface 130 may include, for example, a display, one or more buttons or keys (e.g., function buttons), and/or other input/output mechanisms (e.g., microphone, speakers, cursor, joystick, lights and/or the like).

The device interface 120 may include one or more interface mechanisms for enabling communication with other devices either locally or remotely. In some cases, the device interface 120 may be any means such as a device or circuitry embodied in either hardware, or a combination of hardware and software that is configured to receive and/or transmit data from/to sensors or other components in communication with the processing circuitry 110. In some example embodiments, the device interface 120 may provide interfaces for communication of data to/from the control circuitry 12, the vehicle positioning module 60, the boundary management module 70, the sensor network 90, and/or other functional components 100 via wired or wireless communication interfaces in a real-time manner, as a data package downloaded after data gathering or in one or more burst transmission of any kind.

Each of the vehicle positioning module 60 and the boundary management module 70 may be any means such as a device or circuitry embodied in either hardware, or a combination of hardware and software that is configured to perform the corresponding functions described herein. Thus, the modules may include hardware and/or instructions for execution on hardware (e.g., embedded processing circuitry) that is part of the control circuitry 12 of the robotic mower 10. The modules may share some parts of the hardware and/or instructions that form each module, or they may be distinctly formed. As such, the modules and components thereof are not necessarily intended to be mutually exclusive relative to each other from a compositional perspective.

The vehicle positioning module 60 (or "positioning module") may be configured to utilize one or more sensors (e.g., of the sensor network 90) to determine a location of the robotic mower 10 and direct continued motion of the robotic mower 10 to achieve appropriate coverage of the parcel 20. As such, the robotic mower 10 (or more specifically, the control circuitry 12) may use the location information to determine a mower track and/or provide full coverage of the parcel 20 to ensure the entire parcel is mowed (or otherwise serviced). The vehicle positioning module 60 may therefore be configured to direct movement of the robotic mower 10, including the speed and direction of the robotic mower 10. The vehicle positioning module 60 may also employ such sensors to attempt to determine an accurate current location of the robotic mower 10 on the parcel 20 (or generally).

Various sensors of sensor network 90 of the robotic mower 10 may be included as a portion of, or otherwise communicate with, the vehicle positioning module 60 to, for example, determine vehicle speed/direction, vehicle location, vehicle orientation and/or the like. Sensors may also be used to determine motor run time, machine work time, and other operational parameters. In some embodiments, positioning and/or orientation sensors (e.g., global positioning system (GPS) receiver and/or accelerometer) may be included to monitor, display and/or record data regarding vehicle position and/or orientation as part of the vehicle positioning module 60.

In an example embodiment, the sensor network 90 may provide data to the modules described above to facilitate execution of the functions described above, and/or any other functions that the modules may be configurable to perform. In some cases, the sensor network 90 may include (perhaps among other things) an inertial measurement unit (IMU) 150 and a GPS receiver 152. Other possible sensors may include (but are not limited to) a temperature sensor, humidity sensor, barometer, rain gauge, grass sensor, and/or the like. Generally speaking, the sensor network 90 may include independent devices with on-board processing that communicate with the processing circuitry 110 of the control circuitry 12 via a single data bus, or via individual communication ports. However, in some cases, one or more of the devices of the sensor network 90 may rely on the processing power of the processing circuitry 110 of the control circuitry 12 for the performance of their respective functions. As such, in some cases, one or more of the sensors of the sensor network 90 (or portions thereof) may be embodied as portions of the positioning module 60, the camera 70 and/or the broadcast module 80.

The IMU 150 may include one or more and any or all of combinations of accelerometers, odometers, gyroscopes, magnetometers, compasses, and/or the like. As such, the IMU 150 may be configured to determine velocity, direction, orientation and/or the like so that dead reckoning and/or other inertial navigation determinations can be made by the control circuitry 12. The IMU 150 may be enabled to determine changes in pitch, roll and yaw to further facilitate determining terrain features and/or the like.

Inertial navigation systems may suffer from integration drift over time. Accordingly, inertial navigation systems may require a periodic position correction, which may be accomplished by getting a position fix from another more accurate method or by fixing a position of the robotic mower 10 relative to a known location. For example, navigation conducted via the IMU 150 may be used for robotic mower 10 operation for a period of time, and then a correction may be inserted when a GPS fix is obtained on robotic mower position. As an example alternative, the IMU 150 determined position may be updated every time the robotic mower 10 returns to the charge station 40 (which may be assumed to be at a fixed location). In still other examples, known reference points may be disposed at one or more locations on the parcel 20 and the robotic mower 10 may get a fix relative to any of such known reference points when the opportunity presents itself. The IMU 150 determined position may then be updated with the more accurate fix information.

In some embodiments, the GPS receiver 152 may be embodied as a real time kinematic (RTK)-GPS receiver. As such, the GPS receiver 152 may employ satellite based positioning in conjunction with GPS, GLONASS, Galileo, GNSS, and/or the like to enhance accuracy of the GPS receiver 152. In some cases, carrier-phase enhancement may be employed such that, for example, in addition to the information content of signals received, the phase of the carrier wave may be examined to provide real-time corrections that can enhance accuracy.

In some cases, the boundary management module 70 may be configured to track or manage boundaries and operations relative to such boundaries. In an example embodiment, the boundary management module 70 may store or have access to a plurality of different sets of boundaries. The sets of boundaries may each correspond to sets of stored positions or coordinate locations that form the boundaries. In some cases, the stored positions or coordinate locations may form a continuous or substantially continuous boundary within which the robotic mower 10 is operable. Thus, when the robotic mower 10 reaches or nears the boundary while monitoring its own position, the robotic mower 10 may turn to stay within the boundary. Other methods of boundary designation (with or without wires) may also be employed. For example, the boundaries may be traced on a map and the robotic mower 10 may plot its location on the map and operate to stay within the boundaries traced on the map. Still other methods are also possible.

In an example embodiment, the boundaries may be made variable on the basis of a status or status designation provided for each boundary set. Thus, for example, in some cases each respective boundary set may be classified as active or inactive. The robotic mower 10 may then be controlled to operate within a selected set among the active boundaries. The boundary management module 70 may therefore track boundary set status and control operations relative to boundary sets that are active and selected. An unselected boundary set may be, even if active, available for operation as soon as the set is switched to the selected state. As such, a group or list of boundary sets that are active may be considered to be a candidate listing of potentially selectable boundary sets. Inactive boundary sets may not be selectable, but could become selectable once activated. In some case, active status may further equate to selected status and any active boundary set may be employed as a boundary within which the robotic mower 10 is operable in its current state.

By employing the boundary management module 70 to activate and inactivate (and perhaps also select) boundary sets, the robotic mower 10 may essentially be operable with respect to variable boundaries. As such, the robotic mower 10 is configured to have an adjustable maximum mowing area by simply adjusting the status of the boundary sets. In some cases, the status of various boundary sets may be controllable locally at the robotic mower 10. Thus, for example, the operator may utilize the user interface 130 of the robotic mower 10 to control the status of various boundary sets. However, in other example embodiments, the adjustment of the status of boundary sets may be managed from a remote location or even by using cloud resources. Thus, for example, the electronic device 42 may be configurable (e.g., via an application executable thereat) to interact with the boundary management module 70 at the robotic mower 10 to adjust boundaries (e.g., by adjusting boundary set statuses). However, in other cases, the electronic device 42 may interact with a service hosted in the cloud, and the service may interact with the boundary management module 70, and potentially a plurality of instances of the boundary management module 70 on corresponding multiple robotic mowers. In such an example, one or more accounts may be employed to associate individuals, parcels, entities, organizations, and robotic vehicles with each other and various boundary sets to allow the variable boundary implementation to be managed on an account basis.

As an example of such an embodiment, the robotic mower 10 may be configured with a transceiver or other communication equipment to enable the robotic mower 10 to communicate data related to boundary management either directly or indirectly to the wireless communication network 48. A server 200 of or in communication with the wireless communication network 48 may host an account manager 210 that may manage an account or multiple accounts associated with one or more instances of the boundary management module 70. Boundary sets may therefore be managed on an account basis, and each account may have one or more instances of the boundary management module 70 on respective different robotic vehicles. The different robotic vehicles can be associated with one or more entities, organizations, parcels and/or the like. Each account may have its own boundary sets with their own specific statuses, which can be managed from electronic devices 42 associated with the entities, organizations, parcels and/or the like.

In an example embodiment, when an operator at the electronic device 42 logs into a particular account at the account manager 210, the boundary sets for the boundary management module 70 (or modules) of the particular account may be accessible. If one boundary management module 70 is associated with the particular account, then the boundary sets may be indicated with their respective statuses. The operator may elect to change the statuses of any of the boundary sets. If there are multiple boundary management modules associated with the account, some examples may allow the operator to cycle through each boundary management module and manage the corresponding boundary sets associated with each respective one of the boundary management modules.

The server 200 may include processing circuitry having memory and processor resources similar to those described in reference to the description of FIG. 2 in relation to general function (and in some cases form factor as well). Accordingly, specific descriptions of the memory and processor resources of the server 200 will not be repeated. However, it should be appreciated that the account manager 210 may be instantiated similar to the manner in which the modules described above (e.g., the boundary management module 70 and the positioning module 60) are instantiated at the control circuitry 12. Thus, it should be appreciated that the processing circuitry may be configured to perform the functions attributed to the account manager 210 and/or cause the corresponding functions to be performed responsive to execution of programming instructions at the server 200.

As may be appreciated from the descriptions herein, the account manager 210 may be used to control the variable boundaries implemented at the boundary management module 70. Moreover, since the variable boundary control may be associated with accounts, it can further be appreciated that the account manager 210 may also handle variable boundary management in association with, or as a function of, payment received from the operator. For example, the account manager 210 may be a tool for a cloud-based management service to allow the operator to select the amount of service area to be covered (e.g., by increasing or decreasing the bounded area) based on a service plan or price point selected. Thus, for example, the operator may subscribe to a service and, based on the service level or cost selected, the operator may be allotted a given parcel size or bounded area size for which coverage is available. The operator may then select a boundary set corresponding to the parcel size or bounded area the operator can cover. In some cases, cost, corresponding bounded area (or parcel) size, and/or other features may be packaged or otherwise provided as a selectable service for the operator to select (e.g., via the electronic device 42) by interaction with the account manager 210.

In some examples, the area available for coverage may be provided as a difference between the coverage available for the operator's selected plan and the currently selected boundary set. The operator may then select additional or other boundary sets to increase the bounded area to match (or nearly match) the coverage available for the operator's selected plan. The selection of additional or other boundary sets may occur by selecting active boundary sets as described above. However, expanding (or contracting) of the coverage area can be accomplished by other mechanisms as well.

In this regard, for example, in some cases a map view of the parcel or several parcels may be provided and the operator may drag or trace boundary lines to define a bounded area. The size of the bounded area may be tracked or calculated and the corresponding cost for coverage of the bounded area may be displayed to the operator. Each expansion (or contraction) of the boundary lines defining the bounded area may be considered to be an alteration of the boundaries. When the operator has selected a bounded area of a desired size (e.g., based on the coverage or cost), the corresponding cost may be presented. A plan may be determined (or created) based on matching parameters of available plans to the desired size or determining a cost on the basis of the size. The operator may then select the plan, subscribe to the service or otherwise pay for the desired coverage. The account manager 210 may then interact with the boundary management module 70 to activate (or select) corresponding boundary sets or upload the boundaries traced as a sequence of positions forming the boundary. The robotic mower 10 may then be controlled to operate in the boundaries defined by the boundary management module 70.

In some example embodiments, the service plan or details of an account may also be managed at the account manager 210 to define (or schedule) specific boundary modifications based on time or date. Thus, for example, the boundaries may be expanded or contracted on a scheduled basis with corresponding cost dependent upon the amount of coverage defined at each time or over a given billing period. In some cases, the robotic mower 10 may be placed (or charged) at a generally central location relative to the variable boundaries within which it is expected to operate. However, in some embodiments, the service to which the operator subscribes may include the physical movement or drop off of robotic mowers at locations at which service has been requisitioned, scheduled, requested or otherwise paid for.

Figure 4:
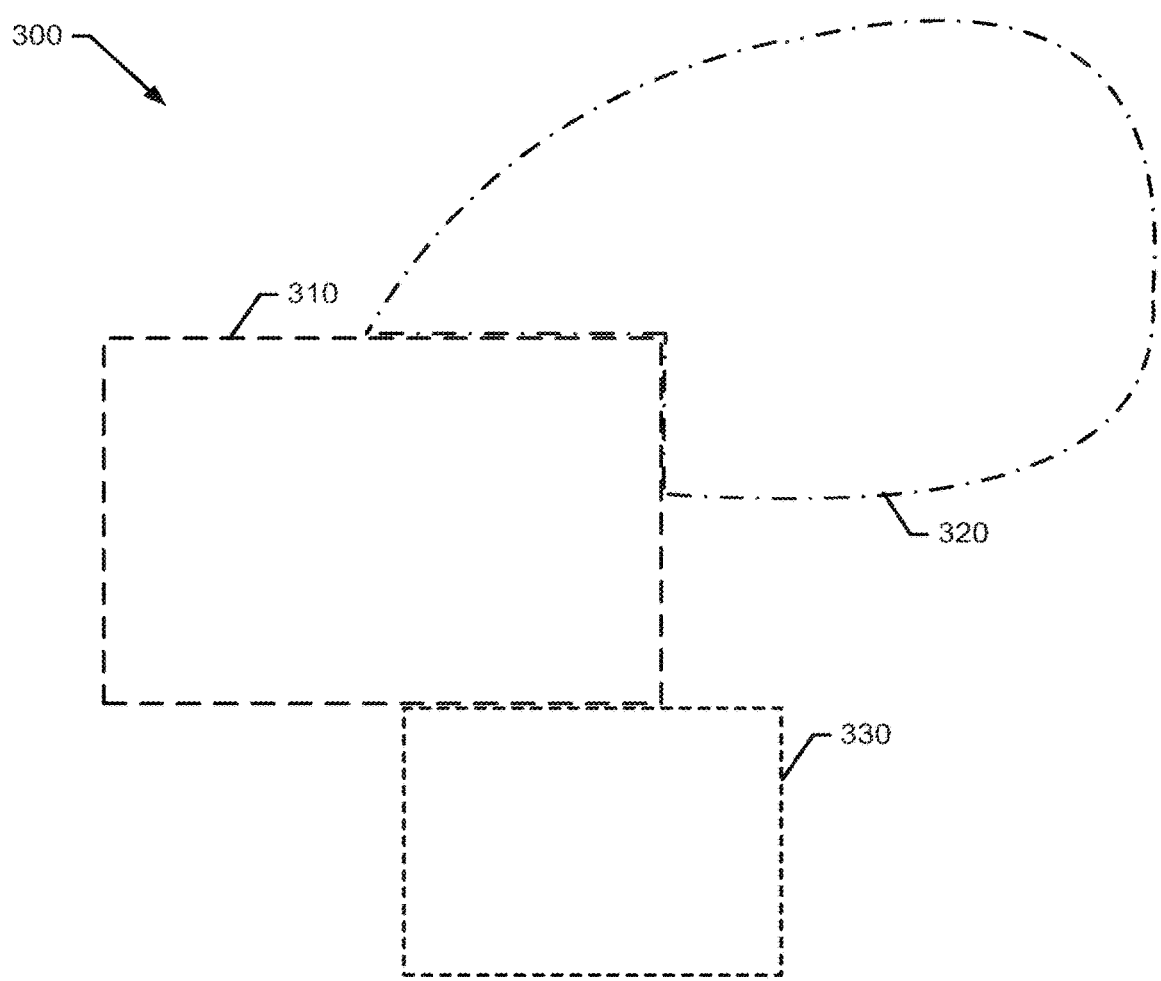
FIG. 4 illustrates a map view of an area with variable boundaries in accordance with an example embodiment.

FIG. 4 illustrates an example map view of a parcel (or area) with variable boundaries. As shown in FIG. 4, the area 300 may include a first boundary set 310, a second boundary set 320 and a third boundary set 330. In some cases, the second and third boundary sets 320 and 330 may be cumulative of the first boundary set 310. However, each boundary set could be exclusive of other boundary sets in other alternative examples. In the example of FIG. 4, an information console displays the amount of area associated with each respective boundary set. A corresponding cost is also provided for each respective boundary set, and for the cumulative cost of the selected boundary set (which in this case is the combination of the first and second boundary sets 310 and 320).

The boundary sets may be portions of a single parcel or separate parcels, and they need not be contiguous or even adjacent. However, the example shown provides the boundary sets to be adjacent for the sake of convenience, and so that a single charge station could serve the entire possible coverage area. The bounded area may be selected by activating individual predefined boundary sets, or by dragging or tracing the boundaries in the manner described above. Other methods for defining the bounded area may also be employed. However, in all cases, the variability of the boundaries is a common feature of example embodiments. Operators may increase or decrease boundaries and incur the corresponding cost associated with the changes made, or operators may subscribe to a service at a given level and have a right to a corresponding amount of coverage. The operators may then allocate or designate the boundaries to be serviced under the subscription. Since the operator can remotely interact with the account manager 210 to make the changes manually, and since the changes can be programmed, the operator can flexibly define the times and areas for which services are to be provided.

By incorporating the sensor network 90 and the modules described above, an operator of the robotic mower 10 may be enabled to flexibly redefine the boundaries inside which the robotic mower 10 is to operate. This may be useful for operators having individual or plural parcels (or zones within parcels) for which they are responsible. Such capability may also enable fleet managers to manage the operation of a number of robotic mowers to provide efficient servicing of large areas. In any case, the satisfaction level or value proposition associated with owning a robotic vehicle such as the robotic mower 10 may be increased.

Figure 3:
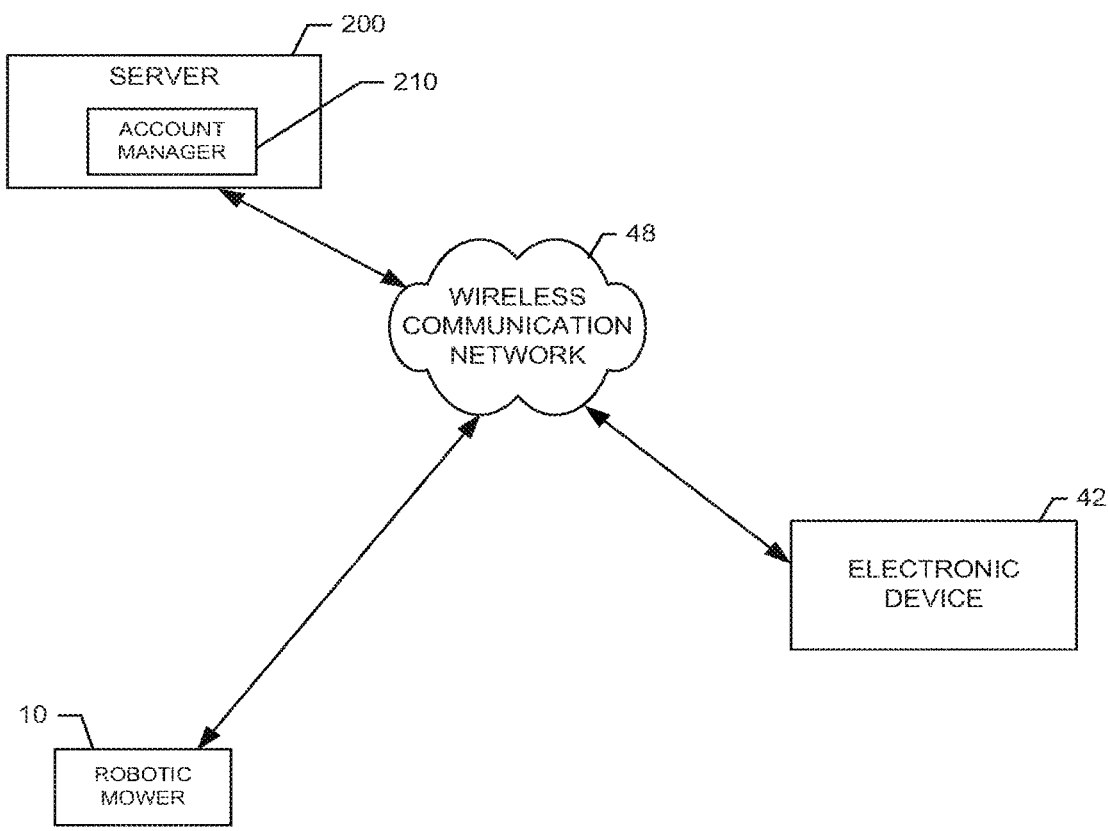
FIG. 3 illustrates a block diagram of some network components that may be employed as part of a communication network for changing boundaries of the robotic mower in accordance with an example embodiment.

Embodiments of the present invention may therefore be practiced using an apparatus such as the one described in reference to FIGS. 1-3. However, it should also be appreciated that some embodiments (or aspects thereof) may be practiced in connection with a computer program product for performing embodiments of the present invention. As such, for example, each block or step of the flowchart of FIGS. 5 and 6, and combinations of blocks in the flowcharts, may be implemented by various means, such as hardware, firmware, processor, circuitry and/or another device associated with execution of software including one or more computer program instructions. Thus, for example, one or more of the procedures described above may be embodied by computer program instructions, which may embody the procedures described above and may be stored by a storage device (e.g., memory 114) and executed by processing circuitry (e.g., processor 112).

As will be appreciated, any such stored computer program instructions may be loaded onto a computer or other programmable apparatus (i.e., hardware) to produce a machine, such that the instructions which execute on the computer or other programmable apparatus implement the functions specified in the flowchart block(s) or step(s). These computer program instructions may also be stored in a computer-readable medium comprising memory that may direct a computer or other programmable apparatus to function in a particular manner, such that the instructions stored in the computer-readable memory produce an article of manufacture including instructions to implement the function specified in the flowchart block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowchart block(s) or step(s).

Figure 5:
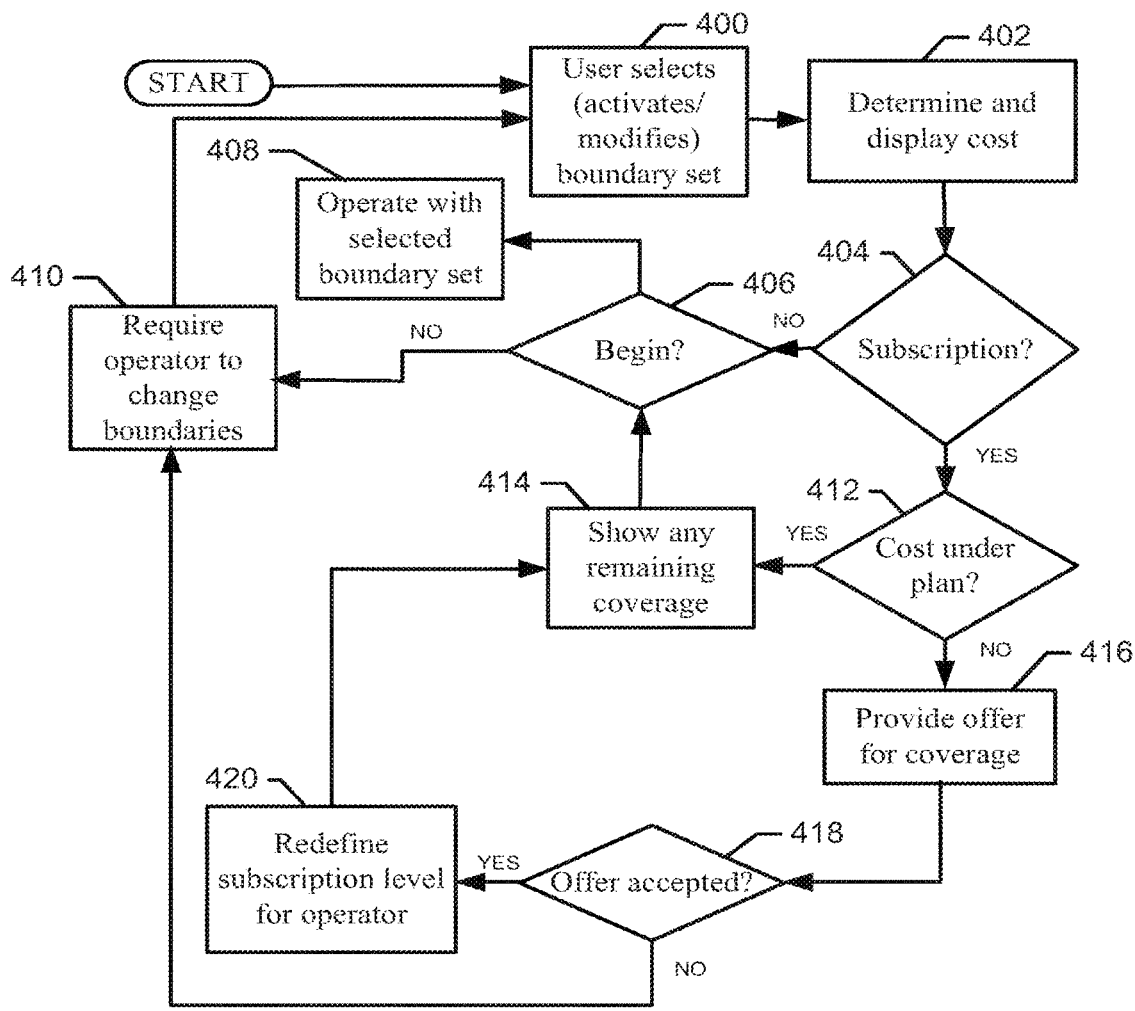
FIG. 5 illustrates a control flow diagram showing various operations that may be executed in accordance with an example embodiment.

FIG. 5 illustrates a control flow diagram of one example of how the robotic mower 10 can be operated in relation to varying boundaries in accordance with an example embodiment. As shown in FIG. 5, operation may begin with operator (or user) selection of a boundary set boundary set at operation 400. This selection may be an activation or other modification that alters the status of a boundary set by changing or creating the boundary set. After the selection, a cost for the coverage selected may be determined and the corresponding cost may be displayed for the operator to view at operation 402. A determination may be made as to whether the operator is a subscriber at operation 404. If the operator is not a subscriber, then the operator may simply be enabled to accept the changes and corresponding costs at operation 406. If the operator elects to incur the cost and/or accept the changes, then operation (e.g., mowing) may begin with the selected boundary at operation 408. However, if the operator does not accept the changes, then the operator may be prompted to change his/her selection at operation 410 and flow may cycle back to operation 400.

If the operator is a subscriber, then a determination may be made as to whether the changed boundary incurs a cost that is less than the coverage provided under the operator's subscription plan at operation 412. If the cost is under the plan, then any remaining coverage available under the plan may be displayed to the operator at operation 414. The operator may again be enabled to accept the cost and changes at 406, with the subsequent options for that determination again applying thereafter.

If the cost is not under the plan, then an offer may be provided to cover the increased cost at operation 416. The offer may be an increased subscription level, or simply a fee for the increased coverage amount desired. The operator may be provided with an opportunity to accept the offer at operation 418. If the operator accepts the offer, then the subscription (or service) level for the operator may be redefined at operation 420 before flow returns to operation 414, and proceeds as described above. However, if the offer is not accepted, then the operator will be prompted to change his/her selection at operation 410 and flow may cycle back to operation 400.

Of note, the processes above may incorporate all of position determining, boundary management, account management and message generation/communication, which can be accomplished based on the inclusion of the sensor network 90 and the modules described above. As such, in some cases, the robotic mower 10 may generally operate in accordance with a control method that combines the modules described above to provide a functionally robust robotic vehicle. In this regard, a method according to example embodiments of the invention may include any or all of the operations shown in FIG. 6. Moreover, other methods derived from the descriptions provided herein may also be performed responsive to execution of steps associated with such methods by a computer programmed to be transformed into a machine specifically configured to perform such methods.

Figure 6:
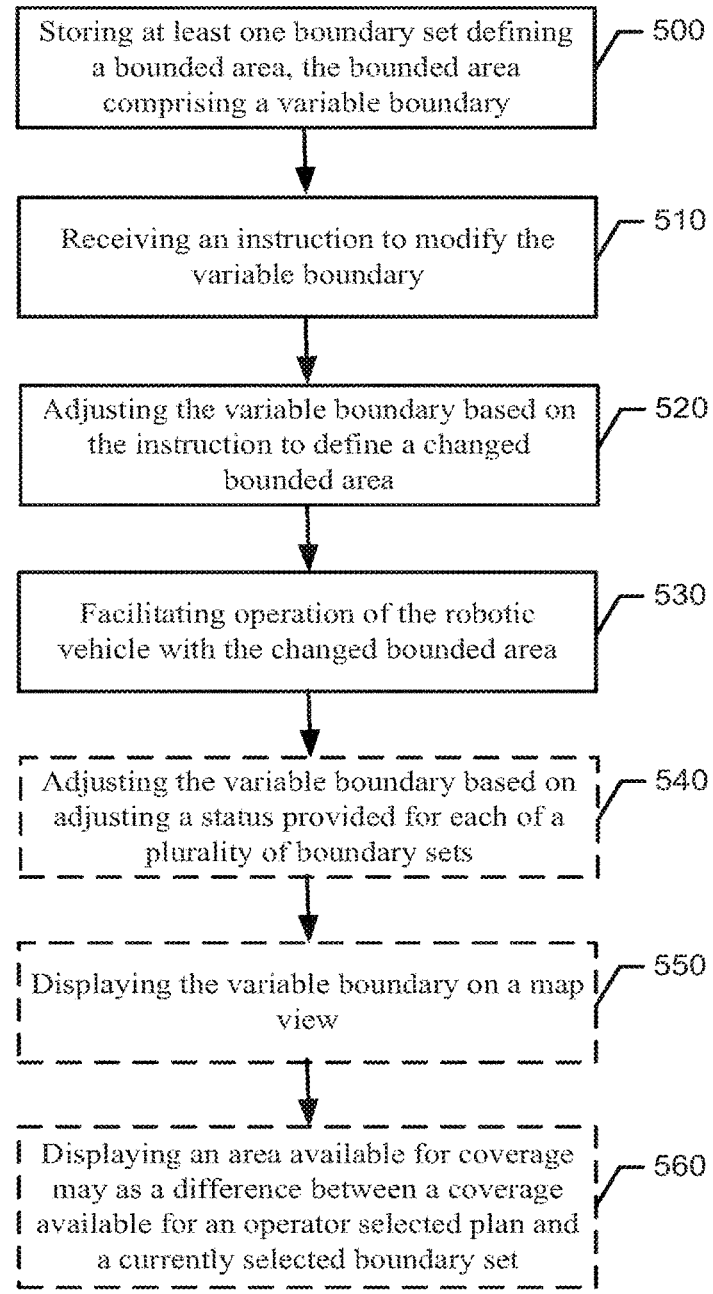
FIG. 6 illustrates a block diagram of one example of a method of preparing broadcast messages in accordance with an example embodiment.

In an example embodiment, a method for providing variable boundaries for a robotic vehicle (e.g., a mower or watering device), as shown in FIG. 6, may include storing at least one boundary set defining a bounded area, the bounded area comprising a variable boundary at operation 500, receiving an instruction to modify the variable boundary at operation 510, adjusting the variable boundary based on the instruction to define a changed bounded area at operation 520, and facilitating operation of the robotic vehicle with the changed bounded area at operation 530.

In some cases, the method may include additional optional operations. Some examples of such optional operations are shown in dashed lines in FIG. 6. In this regard, the method may further include adjusting the variable boundary based on adjusting a status provided for each of a plurality of boundary sets at operation 540. Alternatively or additionally, the method may further include displaying the variable boundary on a map view at operation 550. Alternatively or additionally, the method may further include displaying an area available for coverage may as a difference between coverage available for an operator selected plan and a currently selected boundary set at operation 560.

Thus, for example, the operations 500-560 may also be modified, augmented or amplified in some cases. For example, in some embodiments, receiving the instruction comprises receiving an indication of at least one selected boundary set from a list of active boundary sets. In some cases, receiving the instruction comprises receiving an indication of at least one active boundary set from a list of boundary sets including at least one inactive boundary set. In an example embodiment, the boundary sets may include respective sets of position or coordinate locations defining a corresponding variable boundary location. In some embodiments, receiving the instruction may include receiving the instruction locally via a user interface of the robotic vehicle. In some cases, receiving the instruction may include receiving the instruction from a source remotely located relative to the robotic vehicle. In an example embodiment, receiving the instruction may include receiving the instruction from the operator via an electronic device configured to communicate with the robotic vehicle. In some examples, receiving the instruction may include receiving the instruction from an account manager configured to communicate with the robotic vehicle. In some embodiments, the account manager may be configured to activate at least one boundary set stored at the robotic vehicle. In some cases, the account manager may be configured to transfer at least one boundary set to the robotic vehicle. In an example embodiment, the account manager may be configured to provide the operator with an indication of a cost associated with at least one boundary set and a cost associated with expanding or contracting coverage relative to the at least one boundary set. In some examples, the account manager is configured to define one or more boundary modifications based on time or date.

In an example embodiment, an apparatus for performing the method of FIGS. 5 and 6 above may comprise a processor (e.g., the processor 112) configured to perform some or each of the operations (400-560) described above. The processor 112 may, for example, be configured to perform the operations (400-560) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 400-560 may comprise, for example, the control circuitry 12. Additionally or alternatively, at least by virtue of the fact that the processor 112 may be configured to control or even be embodied as the control circuitry 12, the processor 112 and/or a device or circuitry for executing instructions or executing an algorithm for processing information as described above may also form example means for performing operations 400-560.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

The invention claimed is:

1. A robotic vehicle comprising:
   one or more functional components configured to execute a lawn care function;
   a sensor network comprising one or more sensors configured to detect conditions proximate to the robotic vehicle;
   a positioning module configured to determine a robotic vehicle position while the robotic vehicle traverses a parcel; and
   a boundary management module configured to enable the robotic vehicle to be operated in accordance with a selected boundary set that defines a bounded area within which the robotic vehicle operates;
   wherein the selected boundary set is one of a plurality of boundary sets that are selectable, wherein each boundary set defines a respective bounded area for that boundary set that is predefined, the plurality of boundary sets comprising at least one active boundary set and at least one inactive boundary set;
   wherein boundary management module is configured to vary the selected boundary set, which comprises being configured to:
      select a first boundary set, from the plurality of boundary sets, to be the selected boundary set for operation of the robotic vehicle in accordance with the first boundary set; activate a second boundary set, from the plurality of boundary sets, the second boundary set having been one of the at least one inactive boundary sets; and select the second boundary set to be the selected boundary set for operation of the robotic vehicle in accordance with the second boundary set, wherein the first boundary set and the second boundary define different bounded areas;
   wherein the boundary management module of the robotic vehicle is further configured to receive boundary adjustments to expand or contract a coverage of one of the first boundary set or the second boundary set to respectively increase or decrease a determined cost for operating the robotic vehicle within the one of the first boundary set or the second boundary set.

2. The robotic vehicle of claim 1, wherein the first boundary set is selected from a list of active boundary sets.

3. The robotic vehicle of claim 1, wherein the plurality of boundary sets comprises a list of the at least one inactive boundary set;
   wherein an inactive boundary set is not selectable until activated for inclusion on a list of active boundary sets.

4. The robotic vehicle of claim 3, wherein the boundary management module is configured to receive instructions from an account manager to activate the second boundary set stored at the robotic vehicle.

5. The robotic vehicle of claim 1, wherein each boundary set in the plurality of boundary sets comprises respective positions or coordinate locations defining corresponding boundary locations to define the respective bounded area for that boundary set.

6. The robotic vehicle of claim 1, wherein the boundary management module of the robotic vehicle is configured to receive instructions from an operator to adjust boundary locations for one of the plurality of boundary sets.

7. The robotic vehicle of claim 6, wherein the instructions are received locally via a user interface of the robotic vehicle or received remotely relative to the robotic vehicle.

8. The robotic vehicle of claim 6, wherein the instructions are received from the operator via an electronic device configured to communicate with the robotic vehicle.

9. The robotic vehicle of claim 6, wherein the instructions are received from an account manager configured to communicate with the robotic vehicle.

10. The robotic vehicle of claim 1, wherein the boundary management module is configured to receive, from an account manager, a transfer of at least one boundary set to the robotic vehicle for inclusion in the plurality of boundary sets.

11. The robotic vehicle of claim 1, wherein at least one of the plurality of boundary sets comprises a time or date parameter.

12. The robotic vehicle of claim 1, wherein the boundary management module is configured to display a map view of the bounded area for the selected boundary set.

13. The robotic vehicle of claim 1, wherein the boundary management module is configured to display an area available for coverage as a difference between a coverage available for an operator selected plan and the selected boundary set.

14. A method of adjusting an operating area of a robotic vehicle, the method comprising:
   storing a plurality of boundary sets, each boundary set of the plurality of boundary sets defining a respective bounded area for that boundary set that is predefined, the plurality of boundary sets comprising at least one active boundary set and at least one inactive boundary set;
   selecting a first boundary set, from the plurality of boundary sets, to be a selected boundary set for operation of the robotic vehicle within a first bounded area defined by the first boundary set;
   activating a second boundary set, from the plurality of boundary sets, the second boundary set having been one of the at least one inactive boundary sets;

receiving an instruction to vary the selected boundary set;

in response to receiving the instruction, selecting the second boundary set, from the plurality of boundary sets, to be the selected boundary set for operation of the robotic vehicle within a second bounded area defined by the second boundary set, the first bounded area and the second bounded area being different; and facilitating operation of the robotic vehicle in accordance with the second boundary set within the second bounded area as the selected boundary set;

wherein the method further comprises receiving boundary adjustments to expand or contract a coverage of one of the first boundary set or the second boundary set to respectively increase or decrease a determined cost for operating the robotic vehicle within the one of the first boundary set or the second boundary set.

15. The method of claim 14, wherein the plurality of boundary sets includes a list of active boundary sets and a list of inactive boundary sets, the active boundary sets being selectable and the an inactive boundary sets not being selectable until activated for inclusion on the list of active boundary sets;

wherein receiving the instruction comprises receiving an indication of a selection of an active boundary set from the list of active boundary sets.

16. The method of claim 14, wherein each boundary set within the plurality of boundary sets comprise respective positions or coordinate locations defining corresponding boundary locations for a respective bounded area for that boundary set.

17. The method of claim 14, wherein receiving the instruction comprises receiving the instruction locally via a user interface of the robotic vehicle, or receiving the instruction from a source remotely located relative to the robotic vehicle.

* * * * *